United States Patent [19]

Kryczun

[11] 4,358,119

[45] Nov. 9, 1982

[54] APPARATUS FOR GAS-TIGHT SEALING OF CONNECTION POINTS OF ROTATIONALLY MOUNTED MACHINE PARTS

[75] Inventor: Alfred Kryczun, Cologne, Fed. Rep. of Germany

[73] Assignee: Klöckner-Humboldt-Deutz AG, Fed. Rep. of Germany

[21] Appl. No.: 225,735

[22] Filed: Jan. 16, 1981

[30] Foreign Application Priority Data

Jan. 29, 1980 [DE] Fed. Rep. of Germany ....... 3003001

[51] Int. Cl.³ .............................................. B01D 33/28
[52] U.S. Cl. ......................................... 277/3; 277/27; 277/73
[58] Field of Search ..................... 272/3, 27, 14, 19, 73

[56] References Cited

U.S. PATENT DOCUMENTS

| | | | |
|---|---|---|---|
| 2,407,285 | 9/1946 | King | 277/14 |
| 2,665,929 | 1/1954 | Sawyer | 227/14 |
| 3,851,741 | 12/1974 | Sugahara et al. | 277/73 |
| 3,967,674 | 7/1976 | Fort | 277/73 |
| 4,104,169 | 8/1978 | Müller | 277/27 |

*Primary Examiner*—Robert I. Smith
*Attorney, Agent, or Firm*—Hill, Van Santen, Steadman, Chiara & Simpson

[57] ABSTRACT

An apparatus for gas-tight sealing of the connection points between a stationary machine part and a machine part which is rotationally mounted with respect thereto has an annular disc disposed adjacent to the connection point on one of the machine parts, the annular disc being surrounded by an annular channeled housing which spans the connection point and is mounted on the other of the machine parts. The housing contains at least one washer or packing ring which bears against the annular ring and further includes a structure for applying pressure to the washer to maintain the washer against the ring.

3 Claims, 1 Drawing Figure

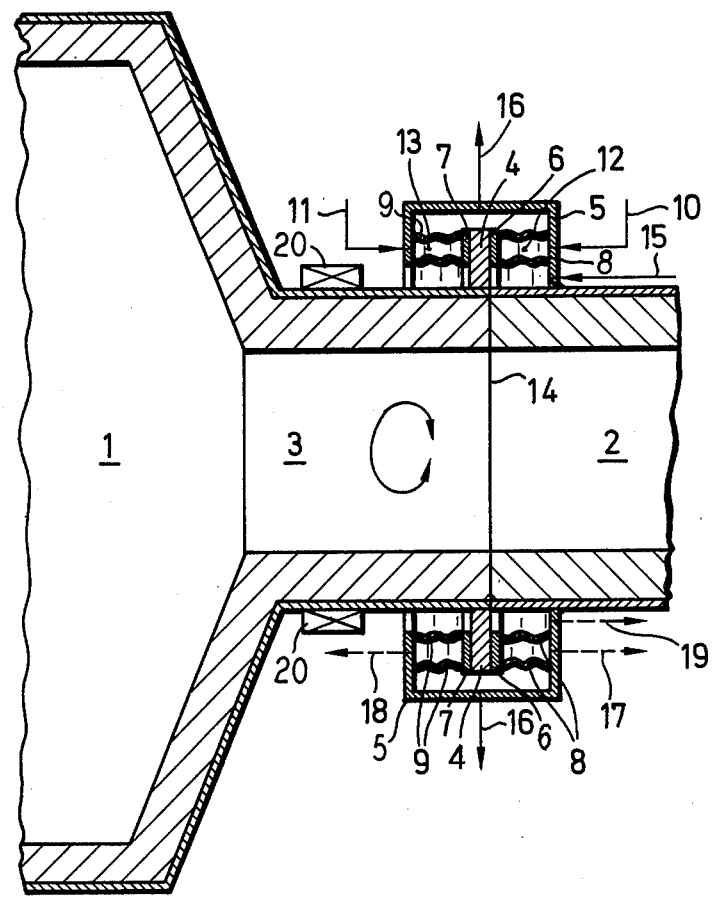

APPARATUS FOR GAS-TIGHT SEALING OF CONNECTION POINTS OF ROTATIONALLY MOUNTED MACHINE PARTS

BACKGROUND OF THE INVENTION

The present invention relates to an apparatus for gas-tight sealing of connection points of rotationally mounted machine parts, and in particular for gas-tight sealing of a stationary machine part and another machine part which rotates with respect thereto.

A gas-tight seal with respect to the atmosphere is difficult to achieve and maintain at the connection points of machine parts which are rotationally mounted with respect to each other such as, for example, a stationary feed or exhaust line which has a reaction cylinder rotationally mounted thereto. Particularly serious difficulties arise in sealing the connection points between such reaction cylinders and the stationary feed or exhaust lines when the thermal processes carried out within the reaction cylinder are conducted at pressures which are above or below atmospheric pressure.

SUMMARY OF THE INVENTION

It is an object of the present invention to provide a gas-tight seal at the connection points of machine parts which are rotationally mounted with respect to each other. It is a further object of the present invention to provide such a seal for the connection points between a stationary feed or exhaust line and a reaction cylinder rotationally mounted thereto.

The above objects are inventively achieved in an apparatus having an annular disc disposed adjacent to the connection point on one of the machine parts, the annular disc being surrounded by a housing having a square U-shaped cross section which spans the connection points and which is mounted on the other machine part. The housing includes at least one washer or packing ring and a means for continuously pressing the packing ring against the annular disc to provide an air-tight seal. A gas-tight seal with respect to the surrounding atmosphere is obtained at the connection point even when during operation the rotationally mounted machine part varies in axial or radial position with respect to the stationary feed or exhaust line. The means for maintaining the washer in a bearing relation against the annular disc is resilient so that, in contrast to conventional sealing devices, a non-uniform deformation of the washer in the region of contact with the annular disc, such as may occur by wear or heat, is avoided. The serviceable life of the various elements of the apparatus is thereby significantly increased in addition to achieving a substantially non-permeable seal.

The above apparatus can be advantageously employed to seal the connection points between feed or exhaust lines serving a reaction cylinder which is rotationally mounted with respect to the stationary line even when thermal processes are undertaken within the reaction cylinders at a pressure which is above or below atmospheric pressure, with an effective and reliable seal to the atmosphere being maintained under such conditions.

In a further embodiment of the invention, the washer or packing ring is supported within the housing and is maintained in pressed or bearing relation against the annular disc by a jacket which is in the form of a bellows which not only achieves a gas-tight seal between the washer and the housing but also permits movement in the axial direction so that a gas-tight seal is maintained at the connection point of the joined machine parts even as the washer wears during operation.

In a further embodiment of the invention, the bellows jacket supporting the washer is hydraulically maintained against the annular disc by fluid pressure agents supplied to the interior of the jacket. By the use of the fluid pressure-supplying agents, the pressure of the washer acting against the annular disc can be selectively varied and thus adjusted to meet particular operating conditions.

Additional lines for the discharge of exhaust gases or for the supply of fluid sealing agents may be connected to the housing.

While a sufficient gas-tight seal can be achieved without the use of such additional lines in most applications, the use of such additional lines assures with certainty that no penetration of gases or air at the connection point to a reaction cylinder which is below atmospheric pressure can occur, and similarly insures that no gases can escape from a reaction cylinder which is at an interior pressure above atmospheric pressure can occur.

DESCRIPTION OF THE DRAWING

The single drawing shows an apparatus constructed in accordance with the principles of the present invention shown in cross section for sealing the connection point between a stationary machine part and a machine part which is rotationally mounted with respect thereto.

DESCRIPTION OF THE PREFERRED EMBODIMENTS

An apparatus for sealing the connection point between a stationary machine part 2 and another machine part 1 which is rotationally mounted with respect to the stationary part 2 is shown in the drawing. While the invention disclosed herein has application to any such arrangement, the invention will be described in the context of a device wherein the stationary part 2 is an exhaust gas line leading from a rotary furnace 1 which has a hollow shaft 3 for transferring exhaust gases to the exhaust line 2. The feed line 3 of the rotationally mounted part 1 joins the stationary part 2 at a connection surface 14. In the embodiment shown in the drawing, the rotationally mounted part 1 has an annular disc 4 disposed adjacent to the connection surface 14, and the stationary part 2 has a housing 5 mounted thereon which spans the connection surface 14 and surrounds the annular disc 4. It will be understood, however, that the annular disc 4 may be mounted on the stationary part 2 and the housing 5 may be mounted on the rotational part 1 without departing from the inventive concept disclosed herein. The rotational part 1 is rotated by a drive means (not shown) in a clockwise or counterclockwise direction, as indicated by the curve arrow, and rides on a suitable bearing means 20.

At least one washer or packing ring is supported within the housing 5 in such a manner as to continously bear or press against the annular ring 4. In the embodiment shown in the drawing, a pair of such washers 6 and 7 bear against opposite sides of the ring 4 and are supported by respective hollow jackets 8 and 9 which are in the form of a small bellows. The jackets 8 and 9 are radially spaced from each other within the housing 5. The jackets 8 and 9 have respective interiors 12 and 13 which are supplied with pressurized fluid from lines 10 and 11 so as to press the washers 6 and 7 against the annular ring 4 in a gas-tight manner. The jackets 8 and 9 are comprised of resilient material which permits the washers 6 and 7 to be maintained against the annular ring 4 by selective pressure application via the lines 10 and 11 so as to provide a gas-tight seal with respect to the atmosphere surrounding the entire connection area 14 formed by the shaft 3 and the stationary part 2. The contact pressure, and thus the sealing effect, can be varied and thereby precisely adapted to particular operating and environmental conditions.

In addition to providing a gas-tight seal, the jackets 8 and 9 achieve a constantly uniform contact pressure over the entire surfaces of the washers 6 and 7 against the annular disc 4 so that axial movement of the rotational part 1 with respect to the stationary part 2 can be permitted without destroying the seal or unduly or non-uniformly wearing the sealing elements.

In a further embodiment of the invention, which has particular advantage for obtaining a reliable gas-tight seal with respect to the atmosphere at the connection area 14 when processes are being undertaken in the rotational part 1 at a pressure which exceeds the atmospheric pressure, an additional line 15 connected to the housing 5 is provided. A fluid sealing agent is introduced through the additional line 15 into the space formed by the exterior of the jacket 8, the housing 5, and the exterior wall of the stationary part 2. The pressure of the sealing agent which is supplied by the additional line 15 can be adapted to the pressure within the rotational part 1, so that pressure compensation or equalization is achieved at the connection point 14.

In a further embodiment of the invention which has particular application when processes are conducted within the rotational part 1 at a pressure less than atmospheric pressure, an additional line 16 is connected to the housing 5 which permits discharge or exhaust of gases at the connection point 14 and permits a pressure less than atmospheric pressure, corresponding to the pressure within the rotary part 1 to be maintained. Additionally, if reactions are conducted within the rotational part 1 at high temperatures, the agents supplied through the lines 10, 11 and 15 may also serve as cooling agents which are then drawn off via additional lines 17, 18 and 19, also connected to the housing 5 and shown in dashed lines. Subsequent to the cooling, the agents can be recirculated in continuous fashion. A reliable and safe seal is thus achieved at the connection area 14 with respect to the atmosphere when processes are conducted in the rotatable part 1, such as a rotary furnace, not only at high temperatures, but also at excess pressure or pressure which is less than atmospheric pressure. The various additional connection lines may be used singly or in combination as conditions warrant.

Modifications may be suggested by those skilled in the art without departing from the inventive concept disclosed herein. For example, the sealing effect may be supplemented by a washer disposed between the stationary part 2 and the rotational part 1 at the connection area 14 if necessary. Additionally, different means for maintaining the washers 6 and 7 in adjacent relation to the annular disc 4 may be employed such as mechanical means such as springs. Other sealing means known to those skilled in the art may be empolyed to supplement the sealing effect of the inventive apparatus such as special processing or smoothing of the contact surfaces between the washers and the annular disc as well as by the use of suitable lubricants. The frictional resistance between the contact surfaces can also be significantly reduced by such means without impairment of the gas-tight seal at the connection point.

Although other modifications and changes may be suggested by those skilled in the art it is the intention of the inventor to embody within the patent warranted hereon all changes and modifications as reasonably and properly come within the scope of his contribution to the art.

I claim as my invention:

1. An apparatus for gas-tight sealing a connection area between a stationary feed line or exhaust line and an exhaust port of a rotary reaction cylinder rotationally mounted with respect to said feed or exhaust lines comprising:
   an annular disc mounted on the exterior of said exhaust port at an edge thereof adjacent to said connection area;
   an annular channeled housing mounted on said stationary feed or exhaust line spanning said connection area and surrounding said annular disc, said housing having a square U-shaped cross section;
   a pair of washers disposed on opposite sides of said annular ring and adjacent thereto; and
   a pair of hollow bellows jackets each having an end thereof connected to an interior wall of said housing and each having an opposite end respectively connected to said washers for supporting said washers in said housing in bearing relation against said annular disc for gas-tight sealing of said connection area.

2. The apparatus of claim 1 further comprising a plurality of lines connected to said housing for supplying circulating cooling agents to the interior of said housing.

3. The apparatus of claim 1 further comprising a means for supplying a hydraulic fluid agent to an interior of said bellows jackets for applying pressure to said washers for maintaining said washers in bearing relation to said annular disc.

* * * * *